United States Patent
Yamaya et al.

(10) Patent No.: US 7,226,982 B2
(45) Date of Patent: Jun. 5, 2007

(54) PROTECTIVE COAT-FORMING COATING COMPOSITION, COATED ARTICLE, AND MULTILAYER LAMINATE

(75) Inventors: Masaaki Yamaya, Gunma-ken (JP); Kazuharu Sato, Gunma-ken (JP); Muneo Kudo, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 205 days.

(21) Appl. No.: 10/824,393

(22) Filed: Apr. 15, 2004

(65) Prior Publication Data

US 2004/0209084 A1    Oct. 21, 2004

(30) Foreign Application Priority Data

Apr. 18, 2003 (JP) .............................. 2003-113737

(51) Int. Cl.
*C08G 77/24* (2006.01)
(52) U.S. Cl. .......................... 528/35; 528/42; 524/837; 524/858; 106/287.13
(58) Field of Classification Search ................. 528/35, 528/42; 524/837, 858; 106/287.13
See application file for complete search history.

(56) References Cited

U.S. PATENT DOCUMENTS

| | | | | |
|---|---|---|---|---|
| 3,542,830 | A | * 11/1970 | Kim et al. ................. | 556/427 |
| 3,627,801 | A | * 12/1971 | Pierce et al. ................ | 556/431 |
| 5,514,741 | A | * 5/1996 | Arai et al. .................. | 524/437 |
| 5,605,958 | A | * 2/1997 | Yoneda et al. .............. | 524/755 |
| 6,572,973 | B1 | 6/2003 | Taruishi et al. | |

FOREIGN PATENT DOCUMENTS

| | | |
|---|---|---|
| EP | 0 166 363 A2 | 1/1986 |
| EP | 0 513 690 A2 | 11/1992 |
| JP | 1-275130 * | 2/1989 |
| JP | 1-272130 A | 11/1989 |
| JP | 6-29332 B2 | 4/1994 |
| JP | 2629813 B2 | 4/1997 |
| JP | 2002-53805 A | 2/2002 |
| JP | 2002-131507 A | 5/2002 |
| WO | WO-00/24831 A1 | 5/2000 |

OTHER PUBLICATIONS

English language translation JP 63-104258 Nov. 2, 1989.*

* cited by examiner

*Primary Examiner*—Margaret G. Moore
(74) *Attorney, Agent, or Firm*—Birch, Stewart, Kolasch & Birch, LLP

(57) ABSTRACT

A coating composition primarily comprising a disilane compound of the formula (A):

$$X_m R^1_{3-m}Si\text{—}Y\text{—}SiR^1_{3-m}X_m \qquad (A)$$

wherein $R^1$ is a monovalent hydrocarbon group, Y is a divalent fluorinated organo group, X is a hydrolyzable group, and m is 1, 2 or 3, or a (partial) hydrolyzate thereof is applied and cured to form a protective coat having excellent chemical resistance and antireflection.

8 Claims, No Drawings

PROTECTIVE COAT-FORMING COATING COMPOSITION, COATED ARTICLE, AND MULTILAYER LAMINATE

This Nonprovisional application claims priority under 35 U.S.C. § 119(a) on Patent Application No(s). 2003-113737 filed in JAPAN on Apr. 18, 2003, the entire contents of which are hereby incorporated by reference.

FIELD OF THE INVENTION

This invention relates to a protective coat-forming coating composition primarily comprising a fluorinated disilane compound of specific structure and/or a (partial) hydrolyzate thereof, a coated article having a protective coat formed by curing the coating composition, and a multilayer laminate.

BACKGROUND ART

Heretofore, fluoroplastics resistant to chemical attacks have been used in the application where chemical resistance is required. Utilizing their inherent low refractive index, fluoroplastics are also employed in the antireflection application as in displays. However, when the fluoroplastics are used as rubber or coating compositions, their molecular structure makes it difficult to form hard protective coatings having mar resistance.

Recently, hydrolyzable silane compounds having perfluoroalkyl groups were developed. To take advantage of their favorable characteristics, a variety of coating compositions comprising hydrolyzable silane compounds have been developed for imparting water repellency, oil repellency, anti-staining and anti-reflection. However, since perfluoroalkyl groups contributing to these favorable characteristics are bulky and inert, the cured coatings have a low crosslinked density. As a result, the cured coatings are fairly hard as compared with fluoroplastics, but still lack mar resistance.

Several systems were developed for enhanced mar resistance. For example, JP-A 2002-53805 describes co-hydrolysis of a perfluoroalkyl group-containing silane and a silane compound such as a tetraalkoxysilane; JP-B 6-29332 describes a system comprising a perfluoroalkyl group-containing silane, a disilane compound having perfluoroalkylene as a spacer, and a tetraalkoxysilane; and Japanese Patent No. 2,629,813 describes a system comprising a disilane compound having perfluoroalkylene as a spacer and an epoxy-functional silane. These systems achieve fairly satisfactory levels of desired properties such as anti-staining, mar resistance, adhesion and antireflection. However, because of a reduced fluorine content, they lack chemical resistance to such chemicals as household detergents. Especially the lack of alkali resistance is outstanding as the weak point of polysiloxane systems. This is problematic on practical use.

There are available no coating compositions that satisfy both mar resistance sufficient to protect transparent substrates and practically necessary chemical resistance to household detergents used in cleaning. There are available no coating compositions that possess multiple functions of antireflection, anti-staining, water repellency and the like as well.

SUMMARY OF THE INVENTION

An object of the invention is to provide a coating composition having improved chemical resistance and mar resistance and useful as a protective coat on plastic substrates or the like; a coated article having a cured coat thereof; and a multilayer laminate.

Making studies on coating compositions that satisfy both a substrate protecting function in terms of mar resistance and a practically necessary level of chemical resistance, and optionally possess a surface modifying function of imparting antireflection, anti-staining, water repellency or the like, inventors have found that when a fluorinated disilane compound of specific structure represented by the formula (A) below and/or a (partial) hydrolyzate thereof, or a mixture of the disilane compound and/or a (partial) hydrolyzate thereof and a fluorinated organo group-containing organosilicon compound represented by the formula (B) below and/or a (partial) hydrolyzate thereof, or a co-hydrolyzate of the mixture is used, there is obtained a coat having improved chemical resistance and mar resistance. The coat is effective as a protective coat on plastic and other substrates which lack such properties.

Since the coat resulting from the inventive composition has a low refractive index, the coat alone or in combination with a high refractive index under-layer having an optical thickness offers a coat having improved antireflection. The multilayer laminate is also improved in transparency, and thus applicable as antireflective optical articles or films having water repellency, anti-staining, anti-fingerprinting and mar resistance, for example, in displays such as computer displays, TV and plasma displays, polarizers in liquid crystal displays, transparent plastic lenses, covers in various instruments, and window panes in automobiles and trains.

Therefore, the present invention provides a protective coat-forming coating composition, a coated article having a protective coat formed by curing the coating composition, and a multilayer laminate, all defined below.

In a first aspect, the invention provides a protective coat-forming coating composition. One embodiment is a coating composition primarily comprising a disilane compound having the formula (A):

$$X_m R^1_{3-m}Si-Y-SiR^1_{3-m}X_m \qquad (A)$$

wherein $R^1$ is a monovalent hydrocarbon group of 1 to 6 carbon atoms, Y is a divalent organo group containing at least one fluorine atom, X is a hydrolyzable group, and m is 1, 2 or 3, or a (partial) hydrolyzate thereof.

In a preferred embodiment, the protective coat-forming coating composition primarily comprises a mixture of (i) a disilane compound having the formula (A) defined above or a (partial) hydrolyzate thereof and optionally, (ii) a fluorinated organo group-containing organosilicon compound having the formula (B):

$$Rf-SiX_3 \qquad (B)$$

wherein Rf is a monovalent organo group containing at least one fluorine atom and X is a hydrolyzable group or a (partial) hydrolyzate thereof, wherein the content of component (i) is 60% by weight to 100% by weight of the mixture.

Another embodiment is a protective coat-forming coating composition primarily comprising a co-hydrolyzate of a mixture of (i) a disilane compound having the formula (A):

$$X_m R^1_{3-m}Si-Y-SiR^1_{3-m}X_m \qquad (A)$$

wherein $R^1$ is a monovalent hydrocarbon group of 1 to 6 carbon atoms, Y is a divalent organo group containing at least one fluorine atom, X is a hydrolyzable group, and m is 1, 2 or 3, or a (partial) hydrolyzate thereof and (ii) a fluorinated organo group-containing organosilicon compound having the formula (B):

$$Rf\text{—}SiX_3 \qquad (B)$$

wherein Rf is a monovalent organo group containing at least one fluorine atom and X is a hydrolyzable group or a (partial) hydrolyzate thereof, wherein the content of component (i) is 60% by weight to less than 100% by weight of the mixture.

In all embodiments, the coating composition may further comprise 50 to 99% by weight based on the coating composition of a solvent.

Most often, Y in formula (A) is $$\text{—}CH_2CH_2(CF_2)_nCH_2CH_2\text{—}$$

wherein n is 2 to 20. In a preferred embodiment, the disilane compound of formula (A) is $$(R^2O)_3Si\text{—}CH_2CH_2(CF_2)_4CH_2CH_2\text{—}Si(OR^2)_3 \text{ or}$$

$$(R^2O)_3Si\text{—}CH_2CH_2(CF_2)_6CH_2CH_2\text{—}Si(OR^2)_3$$

wherein $R^2$ is a monovalent hydrocarbon group of 1 to 6 carbon atoms.

Typically the coating composition cures into a coat having a refractive index of up to 1.410.

In a second aspect, the invention provides a coated article comprising a transparent substrate and a cured coat formed thereon from the protective coat-forming coating composition of the first aspect, serving as a chemical resistant film; or a coated article comprising a transparent substrate and a cured coat formed thereon from the protective coat-forming coating composition of the first aspect, serving as an antireflection film.

In a further embodiment, a coated article is provided comprising a transparent substrate; a layer formed thereon having a higher refractive index than the substrate; and a cured coat formed on the high refractive index layer from the protective coat-forming coating composition of the first aspect, serving as an antireflection film.

The coated article may further include a mar resistant protective layer between the substrate and the high refractive index layer.

In a preferred embodiment, the high refractive index layer comprises a metal oxide sol. Typically the metal oxide sol contains at least one element selected from among Ti, Sn, Ce, Al, Zr and In.

Preferably, a coating composition from which the high refractive index layer is formed is thermosetting or photo-curing. Also preferably, a coating composition from which the protective layer is formed is thermosetting or photo-curing.

Preferably, the transparent substrate comprises an organic resin and/or an inorganic material such as glass or ceramics, and more preferably, a polycarbonate resin, polyalkylene terephthalate resin, cellulose triacetate resin, polystyrene resin or polyolefin resin.

Also contemplated herein is a multilayer laminate comprising the coated article of the second aspect, a tackifier or adhesive layer lying on the transparent substrate side of the coated article, and a release layer lying thereon. The transparent substrate is typically in the form of film.

As used herein, the term "(partial) hydrolyzate" means that a hydrolyzate may be either a partially hydrolyzed product or a completely hydrolyzed product.

As used herein, the phrase "composition primarily comprising a component" means that the composition comprises at least 50% by weight, especially at least 70% by weight of that component based on the total weight of effective components excluding a solvent.

DESCRIPTION OF THE PREFERRED EMBODIMENTS

Component (i) in the protective coat-forming coating composition of the invention is a disilane compound having the formula (A) or a (partial) hydrolyzate thereof.

$$X_mR^1_{3-m}Si\text{—}Y\text{—}SiR^1_{3-m}X_m \qquad (A)$$

Herein $R^1$ is a monovalent hydrocarbon group of 1 to 6 carbon atoms, Y is a divalent organo group containing at least one fluorine atom, X is a hydrolyzable group, and m is equal to 1, 2 or 3.

More particularly, Y is a divalent organo group containing at least one fluorine atom, preferably 4 to 50 fluorine atoms, more preferably 8 to 24 fluorine atoms. Illustrative, non-limiting examples of the divalent organo group represented by Y are given below.

$$\text{—}C_2H_4\text{—}(CF_2)_n\text{—}C_2H_4\text{—}$$

$$\text{—}C_2H_4\text{—}CF(CF_3)\text{—}(CF_2)_n\text{—}CF(CF_3)\text{—}C_2H_4\text{—}$$

$$\text{—}C_2H_4\text{—}CF(C_2F_5)\text{—}(CF_2)_n\text{—}CF(C_2F_5)\text{—}C_2H_4\text{—}$$

$$\text{—}C_2H_4\text{—}CF(CF_3)CF_2\text{—}O(CF_2)_nO\text{—}CF_2CF(CF_3)\text{—}C_2H_4\text{—}$$

(Note that n is an integer of 2 to 20.)

$$\text{—}C_2H_4\text{—}C_6F_{10}\text{—}C_2H_4\text{—}$$

$$\text{—}C_2H_4\text{—}C_6F_4\text{—}C_2H_4\text{—}$$

In order for various functions such as antireflection, anti-staining and water repellency to develop at a satisfactory level, inclusion of a large amount of fluorine atoms is preferred. Since perfluoroalkylene groups are rigid, inclusion of fluorine atoms as much as possible is preferred for the purpose of obtaining a coat having a high hardness and mar resistance. Inclusion of a large amount of fluorine atoms leads to higher chemical resistance. Therefore, Y is preferably a structure:

$$\text{—}CH_2CH_2(CF_2)_nCH_2CH_2\text{—} \text{ or}$$

$$\text{—}C_2H_4\text{—}CF(CF_3)\text{—}(CF_2)_n\text{—}CF(CF_3)\text{—}C_2H_4\text{—}$$

wherein n is an integer of 2 to 20, and more preferably a structure:

$$CH_2CH_2(CF_2)_nCH_2CH_2\text{—}$$

wherein n is an integer of 2 to 20.

The subscript n should have a value of 2 to 20, more preferably in the range of 4 to 12, most preferably in the range of 4 to 10. With a too low value of n, various functions such as antireflection, anti-staining and water repellency may not be fully developed, nor chemical resistance. A too high value of n may lead to a reduced crosslinked density, failing to provide satisfactory mar resistance.

$R^1$ is a monovalent hydrocarbon group of 1 to 6 carbon atoms. Illustrative are alkyl groups such as methyl, ethyl, propyl, butyl, hexyl and cyclohexyl and phenyl. Of these, methyl is preferred to provide satisfactory mar resistance.

The subscript m is equal to 1, 2 or 3, preferably 2 or 3. To form a coat having a high hardness, m=3 is recommended.

X is a hydrolyzable group. Illustrative examples include halogen atoms such as Cl, and organoxy groups represented by $OR^2$ wherein $R^2$ is a monovalent $C_{1-6}$ hydrocarbon group, for example, alkoxy groups such as methoxy, ethoxy, propoxy, isopropoxy and butoxy, alkenoxy groups such as isopropenoxy, acyloxy groups such as acetoxy, ketoxime groups such as methyl ethyl ketoxime, and alkoxyalkoxy groups such as methoxyethoxy. Of these, alkoxy groups are preferred. Methoxy and ethoxy groups are most preferred because silane compounds having such groups are easy to handle and their reaction upon hydrolysis is easy to control.

Illustrative examples of the disilane compound satisfying the above requirement are given below.

$(CH_3O)_3Si—C_2H_4—(CF_2)_4—C_2H_4—Si(OCH_3)_3$ $(CH_3O)_3Si—C_2H_4—(CF_2)_6—C_2H_4—Si(OCH_3)_3$ $(CH_3O)_3Si—C_2H_4—(CF_2)_8—C_2H_4—Si(OCH_3)_3$ $(CH_3O)_3Si—C_2H_4—(CF_2)_{10}—C_2H_4—Si(OCH_3)_3$ $(CH_3O)_3Si—C_2H_4—(CF_2)_{16}—C_2H_4—Si(OCH_3)_3$ $(C_2H_5O)_3Si—C_2H_4—(CF_2)_4—C_2H_4—Si(OC_2H_5)_3$ $(C_2H_5O)_3Si—C_2H_4—(CF_2)_6—C_2H_4—Si(OC_2H_5)_3$ $(CH_3O)_2(CH_3)Si—C_2H_4—(CF_2)_4—C_2H_4—Si(CH_3)(OCH_3)_2$ $(CH_3O)_2(CH_3)Si—C_2H_4—(CF_2)_6—C_2H_4—Si(CH_3)(OCH_3)_2$ $(CH_3O)(CH_3)_2Si—C_2H_4—(CF_2)_4—C_2H_4—Si(CH_3)_2(OCH_3)$ $(C_2H_5O)(CH_3)_2Si—C_2H_4—(CF_2)_6—C_2H_4—Si(CH_3)_2(OC_2H_5)$ $(CH_3O)_3Si—C_2H_4—CF(CF_3)—(CF_2)_4—CF(CF_3)—C_2H_4—Si(OCH_3)_3$ $(CH_3O)_3Si—C_2H_4—CF(CF_3)—(CF_2)_8—CF(CF_3)—C_2H_4—Si(OCH_3)_3$ $(CH_3O)_3Si—C_2H_4—CF(CF_3)—(CF_2)_{12}—CF(CF_3)—C_2H_4—Si(OCH_3)_3$

Of these disilane compounds, the following compounds are preferred.

$(CH_3O)_3Si—C_2H_4—(CF_2)_4—C_2H_4—Si(OCH_3)_3$ $(CH_3O)_3Si—C_2H_4—(CF_2)_6—C_2H_4—Si(OCH_3)_3$ $(CH_3O)_3Si—C_2H_4—(CF_2)_8—C_2H_4—Si(OCH_3)_3$ $(C_2H_5O)_3Si—C_2H_4—(CF_2)_4—C_2H_4—Si(OC_2H_5)_3$ $(C_2H_5O)_3Si—C_2H_4—(CF_2)_6—C_2H_4—Si(OC_2H_5)_3$

Component (ii) which can be used in combination with the disilane compound of formula (A) is a fluorinated organo group-containing organosilicon compound having the formula (B) or a (partial) hydrolyzate thereof.

Rf—SiX$_3$ (B)

Herein Rf is a monovalent organo group containing at least one fluorine atom and X is a hydrolyzable group.

More particularly, Rf is a monovalent organo group containing at least one fluorine atom, preferably 3 to 25 fluorine atoms, more preferably 3 to 17 fluorine atoms. Illustrative examples are given below.

$CF_3C_2H_4—$ $CF_3(CF_2)_3C_2H_4—$ $CF_3(CF_2)_5C_2H_4—$ $CF_3(CF_2)_7C_2H_4—$ $CF_3(CF_2)_9C_2H_4—$ $CF_3(CF_2)_{11}C_2H_4—$ $CF_3(CF_2)_7CONHC_3H_6—$ $CF_3(CF_2)_7CONHC_2H_4NHC_3H_6—$ $CF_3(CF_2)_7C_2H_4OCOC_2H_4SC_3H_6—$ $CF_3(CF_2)_7C_2H_4OCONHC_3H_6—$ $CF_3(CF_2)_7SO_2NHC_3H_6—$ $—C_3F_7O(CF(CF_3)CF_2O)_pCF(CF_3)CONHC_3H_6—$

Herein, p is at least 1, especially 1 to 3. Of these, the following groups are preferred because they are free of a polar moiety.

$CF_3C_2H_4—$ $CF_3(CF_2)_3C_2H_4—$ $CF_3(CF_2)_7C_2H_4—$

X is a hydrolyzable group as exemplified for component (i).

Illustrative examples of the fluorinated organo group-containing organosilicon compound satisfying the above requirement are given below.

$CF_3C_2H_4—Si(OCH_3)_3$ $CF_3C_2H_4—Si(OC_2H_5)_3$ $CF_3(CF_2)_3C_2H_4—Si(OCH_3)_3$ $CF_3(CF_2)_3C_2H_4—Si(OC_2H_5)_3$ $CF_3(CF_2)_5C_2H_4—Si(OCH_3)_3$ $CF_3(CF_2)_7C_2H_4—Si(OCH_3)_3$ $CF_3(CF_2)_7C_2H_4—Si(OC_2H_5)_3$ $CF_3(CF_2)_9C_2H_4—Si(OCH_3)_3$ $CF_3(CF_2)_{11}C_2H_4—Si(OCH_3)_3$ $CF_3(CF_2)_7CONHC_3H_6—Si(OCH_3)_3$ $CF_3(CF_2)_7CONHC_2H_4NHC_3H_6—Si(OCH_3)_3$ $CF_3(CF_2)_7C_2H_4OCOC_2H_4SC_3H_6—Si(OCH_3)_3$ $CF_3(CF_2)_7C_2H_4OCONHC_3H_6—Si(OCH_3)_3$ $CF_3(CF_2)_7SO_2NHC_3H_6—Si(OCH_3)_3$ $C_3F_7O(CF(CF_3)CF_2O)_pCF(CF_3)CONHC_3H_6—Si(OCH_3)_3$

Herein, p is at least 1.

Of these, the following compounds are preferred.

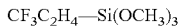

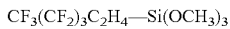

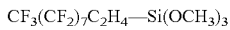

In the invention, component (i) may be used alone or in combination with component (ii). In the second embodiment wherein component (i) is used in combination with component (ii), the content of component (i) should be from 60% by weight to less than 100% by weight. A component (i) content of less than 60% by weight is not preferred because a crosslinked density becomes too low to provide satisfactory mar resistance and so, the function of a protective coat becomes insufficient. The content of component (i) should preferably be at least 95% by weight. In consideration of the addition effect of component (ii), the content of component (i) should preferably be up to 99.5% by weight.

In a further embodiment of the invention, a co-hydrolyzate of a mixture of components (i) and (ii) is used.

While the coating composition of the invention primarily comprises component (i) alone, or a mixture of components (i) and (ii) or a co-hydrolyzate of the mixture, an organosilicon compound or a (partial) hydrolyzate thereof may be incorporated as long as the desired properties are not compromised.

Examples of the organosilicon compound which can be used in combination with components (i) and (ii) include silicates such as tetraethoxysilane, alkylsilanes such as methyltrimethoxysilane, hexyltrimethoxysilane and decyltrimethoxysilane, phenylsilanes such as phenyltrimethoxysilane, and silane coupling agents such as γ-glycidoxypropyltrimethoxysilane, γ-aminopropyltriethoxysilane, γ-methacryloxypropyltrimethoxysilane, and γ-mercaptopropyltrimethoxysilane. In particular, tetraalkoxysilane is effective on combined use for the purpose of improving mar resistance because they serve to increase a crosslinked density, but tend to render the coats hydrophilic and can detract from such functions as anti-staining and water repellency and chemical resistance. It is thus recommended to avoid the use of large amounts of tetraalkoxysilane. The tetraalkoxysilane is preferably used in an amount of up to 5 parts, more preferably up to 2 parts, even more preferably up to 1 parts by weight per 100 parts by weight of component (i) or components (i) and (ii) combined.

The organosilicon compound which can be used in combination with the compounds of formulae (A) and (B), i.e., components (i) and (ii) may be used as such or in a (partially) hydrolyzed form or in a form hydrolyzed in the following solvent. From the standpoint of accelerating the cure speed after coating, it is recommended to use the organosilicon compound in a (partially) hydrolyzed form. The amount of water used in hydrolysis is preferably such that the molar ratio of $H_2O/Si-X$ is between 0.1 and 10.

Hydrolysis may be carried out by a method known to the art. Illustrative examples of hydrolytic catalysts or hydrolytic condensation curing catalysts include acids such as hydrochloric acid, acetic acid and maleic acid; bases such as sodium hydroxide (NaOH), ammonia, amine compounds (e.g., triethylamine, dibutylamine, hexylamine, octylamine, dibutylamine) and salts of amine compounds, and quaternary ammonium salts (e.g., benzyltriethylammonium chloride, tetramethylammonium hydroxide); fluorides such as potassium fluoride and sodium fluoride; solid acidic catalysts and solid basic catalysts (e.g., ion-exchange resin catalysts); the metal salts of organic carboxylic acids, such as iron 2-ethylhexoate, titanium naphthenate, zinc stearate and dibutyltin diacetate; organometallic compounds such as tetrabutoxytitanium, tetra-i-propoxytitanium, organotitanium esters (e.g., dibutoxy(bis-2,4-pentanedionate)titanium, di-i-propoxy(bis-2,4-pentanedionate)titanium), tetrabutoxyzirconium, tetra-i-propoxyzirconium, organozirconium esters (e.g., dibutoxy(bis-2,4-pentane-dionato)zirconium, di-i-propoxy(bis-2,4-pentanedionato)-zirconium), alkoxyaluminum compounds (e.g., aluminum triisopropoxide) and aluminum chelate compounds (e.g., aluminum acetylacetonate complex); and aminoalkyl-substituted alkoxysilanes such as γ-aminopropyltrimethoxysilane, γ-aminopropyltriethoxysilane, N-(β-aminoethyl)-γ-aminopropyl-trimethoxysilane and N-(β-aminoethyl)-γ-aminopropyltriethoxy-silane. Any one or mixtures thereof may be used as the catalyst.

The catalyst is preferably used in an amount of 0.01 to 10 parts by weight, and more preferably 0.1 to 1 part by weight, per 100 parts by weight of the organosilicon compound to be hydrolyzed. At less than 0.01 part by weight, the reaction generally takes too much time to reach completion, or may even fail to proceed altogether. On the other hand, the use of more than 10 parts by weight of catalyst not only entails excessive cost, but also may increase the number of side reactions and result in discoloration of the resulting composition or cured coat.

To adjust the desired properties of the coat such as hardness, mar resistance and electrical conductivity, the coating composition may further include fine particles of an inorganic oxide such as silica, aluminum oxide, titanium oxide, zinc oxide, zirconium oxide, cerium oxide, tin oxide, indium oxide or a complex oxide thereof, or hollow sols thereof. Of these, colloidal silica and hollow silica sol are preferred when it is desired to maintain the coat at a low refractive index. Suitable fine inorganic oxide particles have an average primary particle size of preferably 0.001 to 0.1 μm, and more preferably 0.001 to 0.05 μm. At an average primary particle size larger than 0.1 μm, the cured coat that is formed of the particle-filled composition tends to decline its transparency. If desired, these fine inorganic oxide particles may be surface-treated with an organometallic compound such as a silane, titanium, aluminum or zirconium coupling agent.

Fine inorganic oxide particles, when included in the composition, are added in an amount of preferably 0 to 30 parts by weight, and more preferably 0.1 to 10 parts by weight, calculated as solids, per 100 parts by weight of component (i) or components (i) and (ii) combined. When the composition contains more than 30 parts by weight of fine inorganic oxide particles, the cured coat that is formed therefrom tends to decline its transparency.

The fine inorganic oxide particles are generally used in the form of a dispersion within a dispersing medium, which is typically water or an organic solvent. When water is used as the dispersing medium for the inorganic oxide particles, the dispersing medium is set within a pH range of preferably 2 to 10, and more preferably 3 to 7. Organic solvents which are suitable as the dispersing medium for the fine inorganic oxide particles include alcohols such as methanol, isopropyl alcohol, ethylene glycol, butanol and ethylene glycol monopropyl ether; ketones such as methyl ethyl ketone and methyl isobutyl ketone; aromatic hydrocarbons such as toluene and xylene; amides such as dimethylformamide, dimethylacetamide and N-methylpyrrolidone; esters such as ethyl acetate, butyl acetate and γ-butyrolactone; ethers such as tetrahydrofuran and 1,4-dioxane; and β-diketones and β-ketoesters such as acetylacetone and ethyl acetoacetate. Of these, alcohols and ketones are preferred. The above organic solvents may be used alone or as mixtures of two or more thereof as the dispersing medium.

The coating composition may be used after dilution with a solvent. Suitable solvents for this purpose include alcohols such as methanol, ethanol, propyl alcohol, isopropyl alcohol, n-butyl alcohol, isobutyl alcohol, sec-butyl alcohol, t-butyl alcohol and diacetone alcohol; glycol ethers such as ethylene glycol monomethyl ether, ethylene glycol monoethyl ether, propylene glycol monomethyl ether and propylene glycol monoethyl ether; ketones such as acetone, methyl ethyl ketone, methyl isobutyl ketone and acetylacetone; esters such as ethyl acetate, butyl acetate and ethyl acetoacetate; xylene and toluene. The solvent may be added in any desired amount to form a coating liquid. For ease of application, ease of control of coating thickness and the stability of the coating liquid, the content of the solvent in the coating liquid is preferably 50 to 99% by weight, more preferably 70 to 98% by weight.

The coating composition of the invention may further include optional components, for example, organic or inorganic UV absorbers, leveling agents, and buffer agents for controlling the system to a level of pH 2 to 7 at which silanol groups remain stable, such as acetic acid-sodium acetate or disodium hydrogen phosphate-citric acid.

On use, the coating composition is applied to various substrates and cured to form a cured coat. In the curing step, a curing catalyst similar to the aforementioned hydrolytic catalyst or hydrolytic condensation curing catalyst may be used in a catalytic amount whereby curing is performed in a conventional way.

The cured coat formed on the substrate surface from the inventive coating composition generally has a thickness of 0.01 to 10.0 µm, preferably 0.05 to 8.0 µm. To impart a desired function such as antireflection, the coat is adjusted to an optical film thickness of about 0.1 µm sufficient to attain the purpose. When the coating composition is applied to the substrate surface, any desired application technique may be used, for example, dipping, spin coating, flow coating, roll coating, spray coating and screen printing. For ease of control of film thickness, dipping, spray coating and roll coating techniques are preferably used to apply the composition to a desired film thickness. After the coating composition is applied to various substrates in this way, the coating may be cured by heating or exposure to ultraviolet radiation, obtained a cured coat.

When the protective coat formed from the inventive coating composition is used for the antireflection purpose, the cured coat preferably has a refractive index of up to 1.410. The cured coat having a refractive index of up to 1.410 is applicable alone as an anti-glare layer. A refractive index of up to 1.400 is more preferred.

The transparent substrate to which is applied the inventive coating composition is typically made of glass, ceramics or plastics. Any plastic having excellent optical characteristics may be used for this purpose. Illustrative, non-limiting examples include polycarbonate resins, polyalkylene terephthalate resins such as PET, cellulose resins such as cellulose diacetate, cellulose acetate butyrate and cellulose triacetate, acrylic resins, polystyrene resins, polyimide resins, polyester resins, polyethersulfone resins, liquid crystal resins such as polyarylates, polyurethane resins, polysulfone resins, polyetherketone resins, polyolefin resins such as trimethylpentene and polyvinyl norbornene, and hybrid resins thereof. Of these, polycarbonate resins, polyalkylene terephthalate resins such as PET, cellulose triacetate resins, polystyrene resins and polyolefin resins are especially preferred. The transparent substrate may be in the form of a molded part, sheet, plate or film. A film form transparent substrate is especially preferred for ease of coating operation.

On the cured coat formed on the substrate surface from the inventive coating composition, any of oil repellent, anti-staining coatings may be overlaid. Namely an oil repellent, anti-staining coating may be provided on the antireflective article (having the cured coat formed on the substrate), for the purpose of preventing the antireflective article from oily staining like fingerprinting or facilitating removal of such oily stains.

When the transparent substrate having the inventive coating composition applied and cured thereto is used as an antireflective member possessing both excellent mar resistance and chemical resistance, the coated substrate may be attached to another transparent substrate prior to use. For use of the coated substrate after attachment to another transparent substrate, any well-known adhesive selected from acrylic, epoxy, polyimide and silicone base adhesives and pressure-sensitive adhesives may be applied to the back surface of the substrate remote from the surface coated with the inventive coating composition. Acrylic and silicone base adhesives are preferred. The adhesive layer may have a thickness of about 1 to 500 µm. Too thin an adhesive layer fails to provide an appropriate bonding force whereas too thick a layer is uneconomical. A protective plastic sheet may be provided thereon for the purpose of surface protection.

In an embodiment wherein a coated article comprising a transparent substrate and a cured coat formed thereon from the inventive coating composition is used as an antireflective member, a layer having a higher refractive index than the transparent substrate may be formed and interleaved between the substrate and the cured coat for enhancing antireflective property. In a further embodiment, a mar resistant protective layer may be formed and interleaved between the substrate and the high refractive index layer.

In these embodiments, the curable resin of which the high refractive index layer (or high refractive index cured layer) is formed may be selected from among well-known thermoplastic resins, moisture-curable, thermosetting and photo-curable organic resins and silicone resins. Exemplary of moisture-curable, thermosetting and photo-curable organic resins are thermosetting acrylic resins, moisture-curable acrylic resins, thermoplastic acrylic resins, UV/EB-curable acrylic resins, silane or siloxane-modified acrylic resins, urethane resins, UV/EB-curable epoxy resins, thermosetting silicone resins, moisture-curable silicone resins, UV/EB-curable silicone resins, and the like. Of these, thermosetting and photo-curable resins are preferred. Especially, silicone resins obtained through hydrolysis of various hydrolyzable silane compounds and optional (partial) hydrolytic condensation are advantageous because coatings thereof have a high hardness and are highly adherent to the protective coating layer. UV-curable acrylic resins, epoxy resins and silicone resins are also advantageous because of good adhesion of coatings thereof and high productivity.

For systems to be polymerized and cured by exposure to radiation such as ultraviolet light or electron beams, it is preferred to add a photopolymerization initiator and carry out photopolymerization. Illustrative examples of photopolymerization initiators include arylketone photopolymerization initiators (e.g., acetophenones, benzophenones, alkylaminobenzophenones, benzils, benzoins, benzoin ethers, benzil dimethyl ketals, benzoylbenzoates and α-acyloxime esters), sulfur-containing photopolymerization initiators (e.g., sulfides, thioxanthones), acylphosphine oxide photopolymerization initiators, as well as other photopolymerization initiators.

The photopolymerization initiator may be used in combination with a photosensitizer such as an amine. Specific examples of suitable photopolymerization initiators include 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4-(2-hydroxyethoxy)phenyl}-2-hydroxy-2-methylpropan-1-one, 1-hydroxycyclohexyl phenyl ketone, 2-methyl-1-{4-(methylthio)phenyl}-2-morpholinopropan-1-one, benzil, benzoin, benzoin methyl ether, benzoin ethyl ether, benzoin isopropyl ether, benzoin isobutyl ether, benzil dimethyl ketal, benzophenone, benzoylbenzoic acid, methyl benzoylbenzoate, 4-phenylbenzophenone, hydroxybenzophenone, benzophenone acrylate, 3,3'-dimethyl-4-methoxybenzophenone, 3,3', 4,4'-tetra(t-butylperoxycarbonyl)benzophenone, 9,10-phenanthrenequinone, camphorquinone, dibenzosuberone, 2-ethylanthraquinone, 4',4''-diethylisophthalophenone, α-acyloxime ester, methyl phenylglyoxylate, 4-benzoyl-4'-methyldiphenylsulfide, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, benzoyl diphenylphosphine oxide, 2,6-dimethylbenzoyl diphenylphosphine oxide and bis(2,6-dimethoxybenzoyl)-2,4,4-trimethylpentylphosphine oxide.

The high refractive index cured layer must have a high hardness and as high a refractive index as possible. It is preferred for the high refractive index layer to contain a metal oxide sol and to have a refractive index of at least 1.60. The metal oxide sol included for increasing the refractive index is preferably ultra-fine particles having a refractive index of at least 1.60. This high refractive index metal oxide sol has an average particle size of preferably 1 to 100 nm, and more preferably 1 to 50 nm. No particular limitation is imposed on the amount of high refractive index metal oxide sol included, although the metal oxide sol is preferably used in an amount of 5 to 500 parts by weight, and especially 70 to 250 parts by weight, per 100 parts by weight of the curable resin in the high refractive index layer-forming composition. More than 500 parts by weight of metal oxide sol tends to give rise to undesirable effects such as haze in the cured coating, whereas the use of less than 5 parts by weight may fail to increase the refractive index.

A high refractive index metal oxide sol with a refractive index which is higher than that of the (unfilled) cured resin and is at least 1.60 is desirable for increasing the refractive index of the high refractive index cured resin layer. Specific examples of preferred high refractive index metal oxide sols include metal oxides such as ZnO (n=1.90), $TiO_2$ (n=2.3 to 2.7), $Sb_2O_5$ (n=1.71), $Y_2O_3$ (n=1.87), $La_2O_3$ (n=1.95), $ZrO_2$ (n=2.05), $Al_2O_3$ (n=1.63) and the complex oxide of indium and tin known as ITO (n=1.95), as well as complex oxides including any of the above. Other metal oxide sols such as $In_2O_3$, $SnO_2$, $CeO_2$ and $Fe_2O_3$ may also be used. The use of a titanium atom-containing metal oxide sol is especially preferred since it provides a higher refractive index. The high refractive index metal oxide sol may be surface-modified with a silane compound, an organic functional group-containing silane coupling agent or titanium coupling agent, or an organic functional group-containing acrylic polymer in order to enhance the dispersion stability.

Examples of the dispersing medium in which the high refractive index metal oxide sol is dispersed include water, alcohols such as methanol and ethanol, esters such as ethyl acetate and butyl acetate, ethers such as propylene glycol monoethyl ether, and ketones such as methyl ethyl ketone and methyl isobutyl ketone.

The resin composition for forming the high refractive index cured layer may be diluted with a solvent prior to use. Suitable solvents include methanol, ethanol, diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetylacetone, ethyl acetoacetate, ethyl acetate, butyl acetate, xylene, and toluene.

If necessary, well-known additives such as leveling agents that are used in prior-art coating compositions may also be included.

To maintain the desired optical characteristics (e.g., antireflective properties), the cured film formed from the above-formulated composition as the high refractive index layer should be a thin film having a thickness complying with the desired refractive index. The preferred film thickness is in the range of 0.02 to 3 μm, and especially 0.05 to 0.5 μm.

Described below is the protective layer which may be disposed between the transparent substrate and the high refractive index layer for providing satisfactory mar resistance.

The protective layer must have an excellent adhesion to various types of transparent substrates (e.g., polycarbonate resin, polyalkylene terephthalate resins such as polyethylene terephthalate, cellulose resins such as cellulose triacetate, and glass) and an appropriate hardness at a certain minimum thickness. The protective layer may be made of thermoplastic acrylic resins, UV/EB-curable acrylic resins or silicone resins having functional organic groups such as epoxy groups. Of these, thermosetting or photo-curable resins are preferred, with acrylic resins being most preferred for ease of working. Specific examples of the protective layer include:

(A) a layer prepared by subjecting a radiation-polymerizable composition, and in particular a composition comprising a (meth)acrylic functional group-bearing organosilicon compound, to radiation polymerization so as to effect curing;

(B) a layer prepared by curing a composition comprising an acrylic polymer, and especially a composition comprising a hydrolyzable silyl group-bearing acrylic polymer; and (C) a layer composed of an acrylic polymer, and in particular a thermoplastic acrylic resin containing methyl methacrylate as a major comonomer and having an excellent heat resistance and a high hardness.

To adjust the desired properties of a coating, such as hardness, mar resistance and electrical conductivity, it is desirable to include also fine particles of an inorganic oxide such as silica, aluminum oxide, titanium oxide, zinc oxide, zirconium oxide, cerium oxide, tin oxide, indium oxide, or a complex oxide thereof. Colloidal silica is especially desirable for this purpose. If desired, the fine inorganic oxide particles may be surface-treated with an organometallic compound such as a silane, titanium, aluminum or zirconium coupling agent.

Fine particulate inorganic oxide, if used, is added in an amount of preferably 0.1 to 80 parts by weight, and most preferably 1 to 50 parts by weight, calculated as solids, per 100 parts by weight of the resin. At more than 80 parts by weight, a cured coating obtained from the filled composition tends to decline its transparency.

A conventional ultraviolet absorber may be added to the protective layer to inhibit photo-degradation of the substrate. UV absorbers include inorganic UV absorbers such as fine particulate titanium oxide and zinc oxide, and organic UV absorbers. Preferred organic UV absorbers include derivatives of compounds having a hydroxybenzophenone, benzotriazole, cyanoacrylate or triazine skeleton. Polymers such as vinyl polymers containing these UV absorbers on side chains are also preferred. Specific examples include 2,4'-dihydroxybenzophenone, 2,2',4,4'-tetrahydroxybenzophenone, 2-hydroxy-4-methoxybenzophenone, 2-hydroxy-4-methoxybenzophenon-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzopheone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, 4-(2-acryloxyethoxy)-2-hydroxybenzophenone polymers and 2-(2'-hydroxy-5'-methacryloxyethylphenyl)-2H-benzotriazole polymers. These organic UV absorbers may be used singly or in combinations of two or more thereof.

The thickness of the protective layer is not particularly limited as long as satisfactory mar resistance is obtainable. Usually the thickness is in a range of 0.1 to 10 µm. Too thin a layer fails to provide satisfactory mar resistance whereas too thick a layer is likely to crack. The preferred thickness is in a range of 0.2 to 5 µm.

The protective coat obtained from the inventive coating composition, which has a low refractive index, may also serve as an antireflective coat when used alone or when an underlying layer having a high refractive index is formed to an optical film thickness. The multilayer laminate comprising at least the protective coat and the high refractive index layer is fully transparent and thus suitable for use as antireflective optical members or films endowed with excellent water repellence, stain-proofing properties, ability to prevent fingerprinting, and mar resistance. Examples of such applications include various types of displays (e.g., computer displays, televisions, plasma displays), polarizers for liquid-crystal displays, transparent plastic lens, covers for various types of instruments, and window glass for automobiles and trains.

EXAMPLE

Synthesis examples, examples of the invention, and comparative examples are given below by way of illustration, but are not intended to limit the scope of the invention. In the examples, all parts and percents are by weight. Average molecular weight values are number average molecular weights determined by gel permeation chromatography (GPC) using polystyrene standards.

Synthesis Example 1

A 1-liter flask equipped with a stirrer, a condenser and a thermometer was charged with 29.9 g (0.05 mole) of a disilane compound (I) shown below and 125 g of t-butanol. With stirring at 25° C., 10 g of 0.1N aqueous acetic acid was added dropwise over 10 minutes. Stirring was continued at 25° C. for 20 hours, bringing hydrolysis to completion. To the reaction mixture were added 2 g of aluminum acetylacetonate as a condensation catalyst and 1 g of polyether-modified silicone as a leveling agent. The mixture was stirred for another 30 minutes, yielding a protective coat-forming coating composition solution A.

$$(CH_3O)_3Si-C_2H_4-C_6F_{12}-C_2H_4-Si(OCH_3)_3 \quad (I)$$

To the solution were added 670 g of ethanol, 40 g of propylene glycol monomethyl ether, and 40 g of diacetone alcohol. This dilution yielded a protective coat-forming coating composition solution A-d.

Synthesis Example 2

A 2-liter flask equipped with a stirrer, a condenser and a thermometer was charged with 29.1 g (0.05 mole) of a disilane compound (II) shown below and 125 g of ethanol. With stirring at 25° C., 1 g of a cation exchange resin (Purolite International Ltd.) was added, and 10 g of water was added dropwise over 10 minutes. Stirring was continued at 25° C. for 20 hours, bringing hydrolysis to completion. The ion exchange resin was filtered off, after which 2 g of aluminum acetylacetonate as a condensation catalyst and 1 g of polyether-modified silicone as a leveling agent were added to the reaction mixture. The mixture was stirred for another 30 minutes, yielding a protective coat-forming coating composition solution B.

$$(C_2H_5O)_3Si-C_2H_4-C_4F_8-C_2H_4-Si(OC_2H_5)_3 \quad (II)$$

To the solution were added 650 g of ethanol, 50 g of propylene glycol monomethyl ether, and 50 g of diacetone alcohol. This dilution yielded a protective coat-forming coating composition solution B-d.

Synthesis Example 3

The procedure of Synthesis Example 1 was repeated except that 39.9 g (0.05 mole) of a disilane compound (III) shown below was used instead of the disilane compound (I). By following the subsequent procedure to solution A-d, a protective coat-forming coating composition solution C-d was obtained.

$$(CH_3O)_3Si-C_2H_4-C_{10}F_{20}-C_2H_4-Si(OCH_3)_3 \quad (III)$$

Synthesis Example 4

The procedure of Synthesis Example 1 was repeated except that a mixture of 23.9 g (0.04 mole) of the disilane compound (I) and 2.2 g (0.01 mole) of a silane compound (IV): $CF_3CH_2CH_2-Si(OCH_3)_3$ was used instead of the disilane compound (I). By following the subsequent procedure to solution A-d, a protective coat-forming coating composition solution D-d was obtained.

Synthesis Example 5

The procedure of Synthesis Example 1 was repeated except that a mixture of 28.7 g (0.048 mole) of the disilane compound (I) and 1.1 g (0.002 mole) of a silane compound (V): $C_8F_{17}CH_2CH_2$—$Si(OCH_3)_3$ was used instead of the disilane compound (I). By following the subsequent procedure to solution A-d, a protective coat-forming coating composition solution E-d was prepared.

Synthesis Example 6 (Comparison)

A 3-liter flask equipped with a stirrer, a condenser and a thermometer was charged with 9.0 g (0.015 mole) of the disilane compound (I), 11.4 g (0.02 mole) of the fluorinated silane (V), 2.3 g (0.015 mole) of $Si(OCH_3)_4$, and 570 g of t-butanol. With stirring at 25° C., 3.7 g of 1% aqueous hydrochloric acid was added. Stirring was continued at 25° C. for 24 hours, yielding a protective coat-forming coating composition solution F.

Synthesis Example 7 (Comparison)

A 3-liter flask equipped with a stirrer, a condenser and a thermometer was charged with 22.5 g (0.025 mole) of a disilane compound (VI) shown below, 5.9 g (0.025 mole) of γ-glycidoxypropyltrimethoxysilane, and 520 g of diacetone alcohol. With stirring below 10° C., 3.4 g of 1% aqueous acetic acid was added over 10 minutes. Stirring was continued for one hour below 10° C. and 5 days at 25° C. Thereafter, 1.1 g of aluminum acetylacetonate as a condensation catalyst was added, yielding a protective coat-forming coating composition solution G.

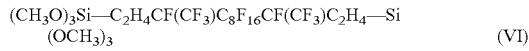

$(CH_3O)_3Si$—$C_2H_4CF(CF_3)C_8F_{16}CF(CF_3)C_2H_4$—$Si(OCH_3)_3$ (VI)

Synthesis Example 8 (Comparison)

A 0.1-liter flask equipped with a stirrer, a condenser and a thermometer was charged with 2.84 g (0.005 mole) of the fluorinated silane (V), 7.2 g (0.033 mole) of the fluorinated silane (IV), 2.6 g (0.013 mole) of $Si(OC_2H_5)_4$, and 5 g of isobutanol. With stirring at room temperature, 3 g of 0.2N aqueous acetic acid was added over 5 minutes. Further, 0.1 g of acetylacetonate was added. Stirring was continued at room temperature for 8 hours, bringing hydrolytic condensation to completion.

To 10 g of the solution were added 15 g of diacetone alcohol, 150 g of ethanol, and 0.1 g of polyether-modified silicone. A protective coat-forming coating composition solution H was prepared.

Synthesis Example 9 (Comparison)

The procedure of Synthesis Example 1 was repeated except that a mixture of 12.0 g (0.02 mole) of the disilane compound (I) and 17.0 g (0.03 mole) of the fluorinated silane (V) was used instead of the disilane compound (I). By following the subsequent procedure to solution A-d, a protective coat-forming coating composition solution J was prepared.

Synthesis Example 10

A 2-liter flask equipped with a stirrer, a condenser and a thermometer was charged with 236.3 g (1.00 mole) of γ-glycidoxypropyltrimethoxysilane, 74.5 g (0.30 mole) of γ-glycidoxypropyldiethoxysilane and 700 g of a methanol-dispersed sol having 30% of active ingredients $TiO_2/ZrO_2/SiO_2$ in a weight ratio of 85/3/12, with a primary particle size of 20 nm. While stirring at room temperature, 70 g of 0.1N aqueous acetic acid was added dropwise over one hour. Stirring was continued at room temperature for another five hours, bringing hydrolysis to completion. To the reaction mixture were added 150 g of diacetone alcohol, 2 g of aluminum acetylacetonate as a condensation catalyst and 2 g of polyether-modified silicone as a leveling agent. Stirring was continued for another 30 minutes, yielding a silicone solution containing a high refractive index sol. Ethanol (600 g) was added to 100 g of the solution, thereby giving a heat-curable, high refractive index layer-forming coating composition K.

Synthesis Example 11

A 1-liter flask equipped with a stirrer, a condenser and a thermometer was charged with 82.0 g (0.35 mole) of γ-acryloxypropyltrimethoxysilane, 32.7 g (0.15 mole) of γ-acryloxypropylmethyldimethoxysilane, 104.2 g (0.50 mole) tetraethoxysilane and 50 g of isobutanol. With stirring at 10° C., 65 g of 0.1N aqueous acetic acid was added dropwise over one hour. Stirring was continued at room temperature for 5 hours, bringing hydrolysis to completion. To the reaction mixture were added 150 g of diacetone alcohol, 1 g of aluminum acetylacetonate as a condensation catalyst and 1 g of polyether-modified silicone as a leveling agent. Stirring was continued for another 30 minutes, yielding an acrylic functional group-bearing silicone solution L.

To 100 g of silicone solution L were added 50 g of trimethylolpropane triacrylate as a polyfunctional acrylic component, 50 g of propylene glycol monomethyl ether, and 1 g of 2-hydroxy-2-methyl-1-phenylpropan-1-one as a photo-polymerization initiator. Stirring yielded a UV-curable, protective layer-forming coating composition solution M.

Synthesis Example 12

To 100 g of acrylic functional group-bearing silicone solution L were added 80 g of a methanol-dispersed sol containing 30% of active ingredients $TiO_2/ZrO_2/SiO_2$ in a weight ratio of 85/3/12 with a primary particle size of 20 nm, 10 g of trimethylolpropane triacrylate, 1 g of aluminum acetylacetonate as a condensation catalyst, 1 g of polyether-modified silicone as a leveling agent, and 1 g of 2-hydroxy-2-methyl-1-phenylpropan-1-one as a photo-polymerization initiator. The mixture was stirred at room temperature.

To 100 g of the silicone solution was added 500 g of ethanol. This dilution yielded a UV-curable, high refractive index layer-forming coating composition N.

Synthesis Example 13

A 1-liter flask equipped with a stirrer, a condenser and a thermometer was charged with 24.8 g (0.10 mole) of γ-methacryloxypropyltrimethoxysilane and 450 g of isopropanol, following which 300 g of colloidal silica dispersed in water (active ingredient content, 20%) was added dropwise. Next, 0.1 g of tetramethylammonium hydroxide was added and the mixture was stirred for 3 hours under heating at 50° C., yielding a silica sol that was surface-treated with methacrylic functional silane.

To 100 g of the surface-treated silica sol were added 40 g of acrylic functional group-bearing silicone solution L, 40 g of trimethylolpropane triacrylate, 20 g of hexamethylenediol diacrylate, and 1 g of 2-hydroxy-2-methyl-1-phenylpropan-1-one. Stirring gave a UV-curable, protective layer-forming coating composition solution P.

Synthesis Example 14

A 1-liter flask equipped with a stirrer, a condenser and a thermometer was charged with 330 g of a 2:1 mixture of the solvents diacetone alcohol and methyl isobutyl ketone, which was heated to 80° C. While the solvent mixture was heated and stirred under a nitrogen atmosphere, a mixture of 24.8 g (0.10 mole) of γ-methacryloxypropyltrimethoxysilane, 180 g (1.80 moles) of methyl methacrylate, 14.2 g (0.10 mole) of glycidyl methacrylate and 2 g of azobisisobutyronitrile was added dropwise over 30 minutes. Heating and stirring at 80° C. were continued for a further 5 hours, giving a solution of hydrolyzable silyl group-bearing acrylic polymer having a number-average molecular weight of 125,000.

Separately, 60 g of 0.1N aqueous acetic acid was added dropwise over 30 minutes to a mixture of 136 g (1.00 mole) of methyltrimethoxysilane and 72 g of isopropanol at room temperature. Following the completion of dropwise addition, 200 g of the acrylic polymer solution prepared above, 0.1 g of sodium formate as a condensation catalyst, 10 g of acetic acid, and 1 g of polyether-modified silicone as a leveling agent were added to the resulting solution. The mixture was stirred, yielding a thermosetting, protective layer-forming coating composition solution Q having an active ingredient content of 31%.

Synthesis Example 15

As in Synthesis Example 14, a mixture of 24.8 g (0.20 mole) of γ-methacryloxypropyltrimethoxysilane, 160 g (1.60 moles) of methyl methacrylate, 64.6 g (0.20 mole) of 2-(2'-hydroxy-5'-methacryloxyethylphenyl)-2H-benzotriazole and 2 g of azobisisobutyronitrile was added dropwise to 370 g of the solvent mixture, yielding a solution containing an acrylic polymer having a number-average molecular weight of 103,000.

Separately, 1.00 mole of γ-aminoethylaminopropyl-trimethoxysilane and 2.00 moles of γ-glycidoxypropyl-dimethoxysilane were subjected to a ring-opening reaction in the presence of 3.00 moles of hexamethyldisilazane. The product was further reacted with 2.00 moles of acetic anhydride to form an adhesion improver. Next, 10 g of a methyl isobutyl ketone solution containing 20% of the adhesion improver was added to 100 g of the solution prepared above, yielding a moisture-curable, protective layer-forming coating composition solution R.

Synthesis Example 16

To 100 g of a propylene glycol monomethyl ether acetate solution containing 30% of poly(methyl methacrylate) resin having a number-average molecular weight of 200,000 were added 3 g of 2,4'-dihydroxybenzophenone and 150 g of diacetone alcohol. The ingredients were stirred until dissolved. A thermoplastic, protective layer-forming coating composition solution S was prepared.

Coating Method

The transparent resin substrates used included 0.5 mm thick polycarbonate (PC) and acrylic resin sheets measuring 10×10 cm, and 50 μm thick polyethylene terephthalate (PET) films measuring 10×10 cm. Onto a transparent resin sheet or film whose surface had been cleaned, a coating composition was applied to a predetermined thickness using either a bar coater or by dipping.

When a protective coat-forming coating composition solution was applied alone, a cured coat having a thickness of 2 to 3 μm was formed.

When multiple layers were formed, respective coating solutions were applied so as to form a protective layer of 3 to 5 μm thick, a high refractive index layer of 0.1 to 0.3 μm thick, and a low refractive index layer (cured coat of a protective coat-forming coating composition solution) of 0.1 to 0.3 μm thick.

Curing Conditions
Heat Curing

The solution was applied, after which the coating was air dried to evaporate off the solvent, then held in a hot air circulation oven at 80 to 120° C. for 5 to 30 minutes to effect curing.

UV Curing

The coating was cured by exposing it three times to a dose of 200 mJ/cm$^2$ with a high-pressure mercury vapor lamp. In the event multiple layers were formed, the underlying layer was cured before the overlying layer was coated and cured.

The following methods were used to measure or evaluate various physical properties.

Mar Resistance Test
Test-1

Using a reciprocal scratch tester (KNT Co., Ltd.) equipped with steel wool #0000, the sample was rubbed back and forth with the wool over ten cycles under a load of 100 g/cm$^2$. The number of streaks was counted.

| Rating | Streaks |
|---|---|
| ⊙ | 0 |
| ○ | 1 or 2 |
| Δ | 3 to 5 |
| X | 6 or more |

Test-2

In Test-1, flannel fabric was used instead of the steel wool and moved back and forth 1000 cycles under a load of 1 kg. The number of flaws was counted.

| Rating | Flaws |
|---|---|
| ○ | no flaw |
| Δ | hazed |
| X | peeled |

Adhesion of Cured Coat

Measured in accordance with JIS K5400. Using a razor blade, the sample was scored with 11 lines each in the vertical and horizontal directions at 1 mm intervals, thereby forming a grid of 100 square sections. A commercial adhesive tape was bonded securely to the scored sample, then rapidly pulled back at an angle of 90 degrees. Some coating sections might be peeled off together. The number of intact sections (X) is reported as X/100.

Refractive Index

Measured by a prism coupler (Seki Technotron Co., Ltd.)

Antireflection

By visual observation, antireflective property was rated as "○" for good and "Δ" for poor.

Chemical Resistance

A droplet of a chemical fluid was dropped or a chemical fluid was applied to a coating, which was allowed to stand over one day. After the chemical fluid was removed, the surface state was visually inspected. The chemical fluids used were 0.1 N NaOH, ethanol, household detergents Mypet® and Magiclean® and skin care creme Nivea® (trade marks are all products of Kao Co., Ltd.).

| Rating | State |
|---|---|
| ○ | unchanged |
| Δ | marks remained |
| X | coating dissolved away |

Examples 1–3

On an acrylic resin sheet and a PC sheet, each of the protective coat-forming coating composition solutions A and B obtained in Synthesis Examples 1 and 2 was applied as a protective layer coating to form a single layer. The coating properties of these coated sheets were examined by the aforementioned tests. The results are shown in Table 1.

TABLE 1

|  | Example 1 | Example 2 | Example 3 |
|---|---|---|---|
| Substrate | acrylic | acrylic | PC |
| Coating composition | A | B | A |
| Mar resistance Test-1 | ◎ | ◎ | ◎ |
| Test-2 | ○ | ○ | ○ |
| Adhesion (X/100) | 100/100 | 100/100 | 100/100 |
| Chemical resistance 0.1 N NaOH | ○ | ○ | ○ |
| Mypet ® | ○ | ○ | ○ |
| Nivea ® | ○ | ○ | ○ |
| Magiclean ® | ○ | ○ | ○ |
| Ethanol | ○ | ○ | ○ |
| Refractive index | 1.399 | 1.389 | 1.399 |

It is seen from Table 1 that the coats obtained from the protective coat-forming coating compositions within the scope of the invention exhibit excellent mar resistance and chemical resistance and have a refractive index of less than 1.400.

Examples 4–8 and Comparative Examples 1–4

On PET films, protective layer-forming coating composition solutions M, P, Q, R and S, high refractive index layer-forming coating composition solutions N and K, protective coat-forming coating composition solutions A-d, B-d, C-d, D-d, E-d, F, G, H and J, prepared in Synthesis Examples 1 to 16, were successively applied and cured to form multilayer laminates. The coating properties of these laminates were examined by the aforementioned tests. The results are shown in Table 2.

TABLE 2

|  |  | Example | | | | | Comparative Example | | | |
|---|---|---|---|---|---|---|---|---|---|---|
|  |  | 4 | 5 | 6 | 7 | 8 | 1 | 2 | 3 | 4 |
| Protective layer |  | M | P | Q | R | S | M | M | M | M |
| High refractive index layer |  | K | N | K | N | N | K | K | K | K |
| Coating composition |  | A-d | B-d | C-d | D-d | E-d | F | G | H | J |
| Mar resistance | Test-1 | ◎ | ◎ | ◎ | ◎ | ◎ | ○ | X | Δ | X |
|  | Test-2 | ○ | ○ | ○ | ○ | ○ | ○ | Δ | ○ | X |
| Adhesion (X/100) |  | 100 | 100 | 100 | 100 | 100 | 90 | 100 | 100 | 30 |
| Chemical resistance | 0.1 N NaOH | ○ | ○ | ○ | ○ | ○ | X | Δ | X | ○ |
|  | Mypet ® | ○ | ○ | ○ | ○ | ○ | Δ | ○ | Δ | ○ |
|  | Nivea ® | ○ | ○ | ○ | ○ | ○ | ○ | ○ | Δ | ○ |
|  | Magiclean ® | ○ | ○ | ○ | ○ | ○ | ○ | ○ | Δ | ○ |
|  | Ethanol | ○ | ○ | ○ | ○ | ○ | ○ | ○ | Δ | ○ |
| Antireflection |  | ○ | ○ | ○ | ○ | ○ | ○ | Δ | ○ | ○ |

It is seen from Table 2 that the coats obtained from the protective coat-forming coating compositions within the scope of the invention exhibit excellent mar resistance, chemical resistance and antireflection.

The protective coat-forming coating compositions of the invention form cured coats having excellent chemical resistance and antireflection.

Japanese Patent Application No. 2003-113737 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed:

1. A protective coat-forming coating composition primarily comprising:

100 parts by weight of a co-hydrolyzate of a mixture of
(i) a disilane compound having the formula (A):

$$X_m R^1_{1-m} Si-Y-SiR^1_{3-m} X_m \quad\quad (A)$$

wherein $R^1$ is a monovalent hydrocarbon group of 1 to 6 carbon atoms, Y is a divalent organo group containing at least one fluorine atom, X is a hydrolyzable group, and m is 1, 2 or 3, or a (partial) hydrolyzate thereof, and (ii) a fluorinated organo group-containing organosilicon compound having the formula (B):

$$Rf-SiX_3 \quad\quad (B)$$

wherein Rf is a monovalent organo group containing at least one fluorine atom and X is a hydrolyzable group or a (partial) hydrolyzate thereof, wherein the content of component (i) is 95% by weight to 99.5% by weight of the mixture;

0.1 to 30 parts by weight of fine particles of silica in the form of a colloidal silica and/or a hollow silica sol, a dispersing water of which is set within a pH range of 2 to 7, and a solvent in such an amount that the content of the solvent is 50 to 99% by weight based on the coating composition.

2. The coating composition of claim 1, wherein Y in formula (A) is

—CH$_2$CH$_2$(CF$_2$)$_n$CH$_2$CH$_2$— wherein n is 2 to 20.

3. The coating composition of claim 1, wherein the disilane compound of formula (A) is (R$^2$O)$_3$Si—CH$_2$CH$_2$(CF$_2$)$_4$CH$_2$CH$_2$—Si(OR$^2$)$_3$ or (R$^2$O)$_3$Si—CH$_2$CH$_2$(CF$_2$)$_6$CH$_2$CH$_2$—Si(OR$^2$)$_3$ wherein R$^2$ is a monovalent hydrocarbon group of 1 to 6 carbon atoms.

4. The coating composition of claim 1, which cures into a coat having a refractive index of up to 1.410.

5. A coated article comprising a transparent substrate and a cured coat formed thereon from a protective coat-forming coating composition primarily comprising:

100 parts by weight of a co-hydrolyzate of a mixture of (i) a disilane compound having the formula (A);

X$_m$R$^1_{3-m}$Si—Y—SiR$^1_{3-m}$X$_m$ (A)

wherein R$^1$ is a monovalent hydrocarbon group of 1 to 6 carbon atoms, Y is a divalent organo group containing at least one fluorine atom, X is a hydrolyzable group, and m is 1, 2 or 3, or a (partial) hydrolyzate thereof, and (ii) a fluorinated organo group-containing organosilicon compound having the formula (B):

Rf–SiX$_3$ (B)

wherein Rf is a monovalent organo group containing at least one fluorine atom and X is a hydrolyzable group or a (partial) hydrolyzate thereof, wherein the content of component (i) is 95% by weight to 99.5% by weight of the mixture;

0.1 to 30 parts by weight of fine particles of silica in the form of a colloidal silica and/or a hollow silica sol, a dispersing water of which is set within a pH range of 2 to 7, and a solvent in such an amount that the content of the solvent is 50 to 99% by weight based on the coating composition, serving as an antireflection film.

6. A coated article comprising a transparent substrate and a cured coat formed thereon from a protective coat-forming coating composition primarily comprising:

100 parts by weight of a co-hydrolyzate of a mixture of (i) a disilane compound having the formula (A);

X$_m$R$^1_{3-m}$Si—Y—SiR$^1_{3-m}$X$_m$ (A)

wherein R$^1$ is a monovalent hydrocarbon group of 1 to 6 carbon atoms, Y is a divalent organo group containing at least one fluorine atom, X is a hydrolyzable group, and m is 1, 2 or 3, or a (partial) hydrolyzate thereof, and (ii) a fluorinated organo group-containing organosilicon compound having the formula (B):

Rf–SiX$_3$ (B)

wherein Rf is a monovalent organo group containing at least one fluorine atom and X is a hydrolyzable group or a (partial) hydrolyzate thereof, wherein the content of component (i) is 95% by weight to 99.5% by weight of the mixture;

0.1 to 30 parts by weight of fine particles of silica in the form of a colloidal silica and/or a hollow silica sol, a dispersing water of which is set within a pH range of 2 to 7, and a solvent in such an amount that the content of the solvent is 50 to 99% by weight based on the coating composition, serving as a chemical resistant film.

7. The coated article of claim 6 wherein said transparent substrate comprises an organic resin and/or an inorganic material such as glass or ceramics.

8. The coated article of claim 6 wherein said transparent substrate comprises a polycarbonate resin, polyalkylene terephthalate resin, cellulose triacetate resin, polystyrene resin or polyolefin resin.

* * * * *